(12) United States Patent
Hong

(10) Patent No.: US 12,207,355 B2
(45) Date of Patent: Jan. 21, 2025

(54) RANDOM ACCESS METHOD AND APPARATUS, AND COMPUTER READABLE STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 399 days.

(21) Appl. No.: 17/546,720

(22) Filed: Dec. 9, 2021

(65) Prior Publication Data
US 2022/0104003 A1 Mar. 31, 2022

Related U.S. Application Data

(63) Continuation of application No. PCT/CN2019/090688, filed on Jun. 11, 2019.

(51) Int. Cl.
*H04W 8/20* (2009.01)
*H04L 1/00* (2006.01)
*H04W 74/0833* (2024.01)
*H04W 84/04* (2009.01)

(52) U.S. Cl.
CPC ............. *H04W 8/20* (2013.01); *H04L 1/0025* (2013.01); *H04W 74/0833* (2013.01); *H04W 84/042* (2013.01)

(58) Field of Classification Search
CPC . H04W 8/20; H04W 74/0833; H04W 84/042; H04W 48/18; H04L 1/0025
See application file for complete search history.

(56) References Cited

U.S. PATENT DOCUMENTS

| | | | |
|---|---|---|---|
| 10,028,305 B2* | 7/2018 | Han ....................... | H04W 68/02 |
| 11,012,974 B2* | 5/2021 | Murray ............. | H04W 52/0229 |
| 2017/0019930 A1* | 1/2017 | Lee ......................... | H04W 72/21 |
| 2020/0322948 A1* | 10/2020 | Xue ....................... | H04J 3/02 |
| 2022/0248369 A1* | 8/2022 | Wu ....................... | H04W 24/08 |

FOREIGN PATENT DOCUMENTS

WO    WO-2019178728 A1 * 9/2019

* cited by examiner

*Primary Examiner* — Austin J Moreau
(74) *Attorney, Agent, or Firm* — Cozen O'Connor

(57) ABSTRACT

A random access method and apparatus, and a computer readable storage medium. The method is applied to a multi-card terminal, and at least two subscriber identification module SIM cards are installed on the multi-card terminal, the method includes: obtaining first random access preambles selected by the at least two SIM cards; and selecting different modes for the at least two SIM cards to carry out a random access in response to the first random access preambles selected by the at least two SIM cards being the same.

7 Claims, 4 Drawing Sheets

RANDOM ACCESS METHOD AND APPARATUS, AND COMPUTER READABLE STORAGE MEDIUM

CROSS-REFERENCE TO RELATED APPLICATION

This application is a continuation application of International Application No. PCT/CN2019/090688, filed on Jun. 11, 2019, the entire contents of which are incorporated herein by reference.

TECHNICAL FIELD

The disclosure relates to the field of communication technology, in particular to a random access method, a random access apparatus, and a computer-readable storage medium.

BACKGROUND

With the development of wireless communication technology, more multi-card terminals have emerged. The typical application scenarios of a multi-card terminal include the following two scenarios. In scenario 1, a business user has a private card and a business card, and puts the two cards on a same terminal. In scenario 2, an ordinary user has multiple private cards, and can choose which card to use for different transactions, and these cards may come from the same operator, or from different operators.

SUMMARY

In view of this, this disclosure provides a random access method and a random access apparatus, and a computer-readable storage medium.

Embodiments of the disclosure provide a random access method. The method is applied to a multi-card terminal, and at least two subscriber identification module SIM cards are installed on the multi-card terminal, the method includes: obtaining first random access preambles selected by the at least two SIM cards; and selecting different modes for the at least two SIM cards to carry out a random access in response to the first random access preambles selected by the at least two SIM cards being the same.

Embodiments of the disclosure provide a random access apparatus. The apparatus is applied to a multi-card terminal, and at least two subscriber identification module SIM cards are installed on the multi-card terminal. The apparatus includes a processor; a memory for storing instructions executable by the processor; in which the processor is configured to: obtain first random access preambles selected by the at least two SIM cards; and select different modes for the at least two SIM cards to carry out a random access in response to the first random access preambles selected by the at least two SIM cards being the same.

Embodiments of the disclosure provide a computer-readable storage medium having computer instructions stored thereon. When the instructions are executed by a processor, the processor is caused to implement a random access method, the method is applied to a multi-card terminal, and at least two subscriber identification module SIM cards are installed on the multi-card terminal, and the method includes: obtaining first random access preambles selected by the at least two SIM cards; and selecting different modes for the at least two SIM cards to carry out a random access in response to the first random access preambles selected by the at least two SIM cards being the same It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Currently, the mode for processing the multi-card terminal is mainly based on the implementation of various terminal manufacturers without unified implementation standard, which leads to different terminal behaviors and processing modes. Moreover, the existing dual-card dual-standby terminal generally applies for two international mobile equipment identities (IMEIs). Since the terminal is resident on the network, the network performs the identity verification. If the two cards of a dual-card terminal use the same IMEI, the core network will be confused, which may cause the identity verification to fail and eventually cause the terminal to fail to reside. However, for a multi-card terminal, the existing network regards different subscriber identification module (SIM) cards as different terminals, and the multiple cards of the multi-card terminal select the preambles when the random access is performed independently at power up. In this case, it is very likely that multiple cards belonging to the same multi-card terminal have selected the same random access preamble, which will cause random access failure of a certain SIM card or multiple SIM cards, and affects the performance of the multi-card terminal.

The technical solution provided by the embodiments of the disclosure may include the following beneficial effects.

When the random access preambles selected by at least two SIM cards of the multi-card terminal are the same, different modes are selected for the random access for the at least two SIM cards, so as to solve the problem of self-collision of the multi-card terminal in the random access process. Therefore, the probability of successful random access of one SIM card or multiple SIM cards belonging to the same multi-card terminal is increased, and the performance of the multi-card terminal is improved.

Figure 1:
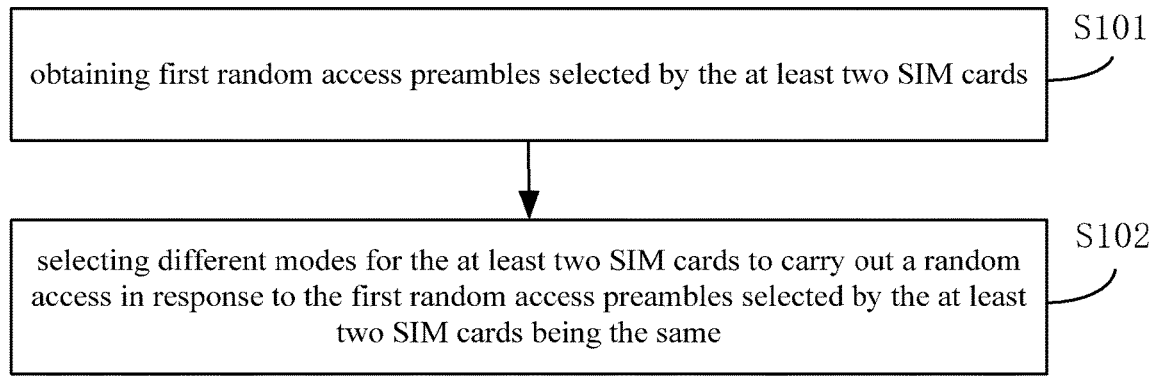
FIG. 1 is a flowchart of a random access method according to an exemplary embodiment of the disclosure.

FIG. 1 is a flowchart of a random access method according to an exemplary embodiment of the disclosure. This embodiment is described from the side of a multi-card terminal. At least two SIM cards are installed on the multi-card terminal. As shown in FIG. 1, the random access method includes the following steps.

In step S101, first random access preambles selected by the at least two SIM cards are obtained.

After the multi-card terminal is turned on, at least two SIM cards of the multi-card terminal will be ready to start the random access. When the first random access preambles are selected for the at least two SIM cards, the multi-card terminal is informed of the selected random access preambles.

In step S102, different modes for the at least two SIM cards to carry out a random access are selected in response to the first random access preambles selected by the at least two SIM cards being the same.

In this embodiment, if the random access preambles selected by the at least two SIM cards are the same, the random access is performed on the first SIM card using the selected random access preamble, a second random access preamble different from the first random access preamble for a second SIM card different from the first SIM card among the at least two SIM cards is reselected, and the random access is performed on the second SIM card using the second random access preamble.

For example, there are two SIM cards in the existing multi-card terminal, namely SIM card 11 and SIM card 12. The random access preamble selected by SIM card 11 is X, and the random access preamble selected by SIM card 12 is also X, the random access is performed on SIM card 11 using X, and a random access preamble different from X is reselected for SIM card 12, for example, Y, so that the random access is performed on SIM card 12 using Y.

In this embodiment, if the random access preambles selected by the at least two SIM cards are the same, different physical random access channel (PRACH) resources can be selected for the at least two SIM cards, so that the at least two SIM cards send the random access preambles through different PRACH resources.

For example, there are two SIM cards in the existing multi-card terminal, namely SIM card 11 and SIM card 12. The random access preamble selected by SIM card 11 is X, and the random access preamble selected by SIM card 12 is X. Different PRACH resources can be selected for SIM card 11 and the SIM card 12, so that SIM card 11 and SIM card 12 send the random access preamble X through different PRACH resources.

In the embodiment, the random access preamble is reselected for the second SIM card by: in response to one second SIM card, reselecting the second random access preamble different from the first random access preamble for the second SIM card; and in response to multiple second SIM cards, reselecting different second random access preambles different from the first random access preamble for the multiple second SIM cards.

In the above embodiment, when the random access preambles selected by the at least two SIM cards of the multi-card terminal are the same, different modes are selected for the random access for the at least two SIM cards, so as to solve the problem of self-collision of the multi-card terminal in the random access process. Therefore, the probability of successful random access of one SIM card or multiple SIM cards belonging to the same multi-card terminal is increased, and the performance of the multi-card terminal is improved.

Figure 2A:
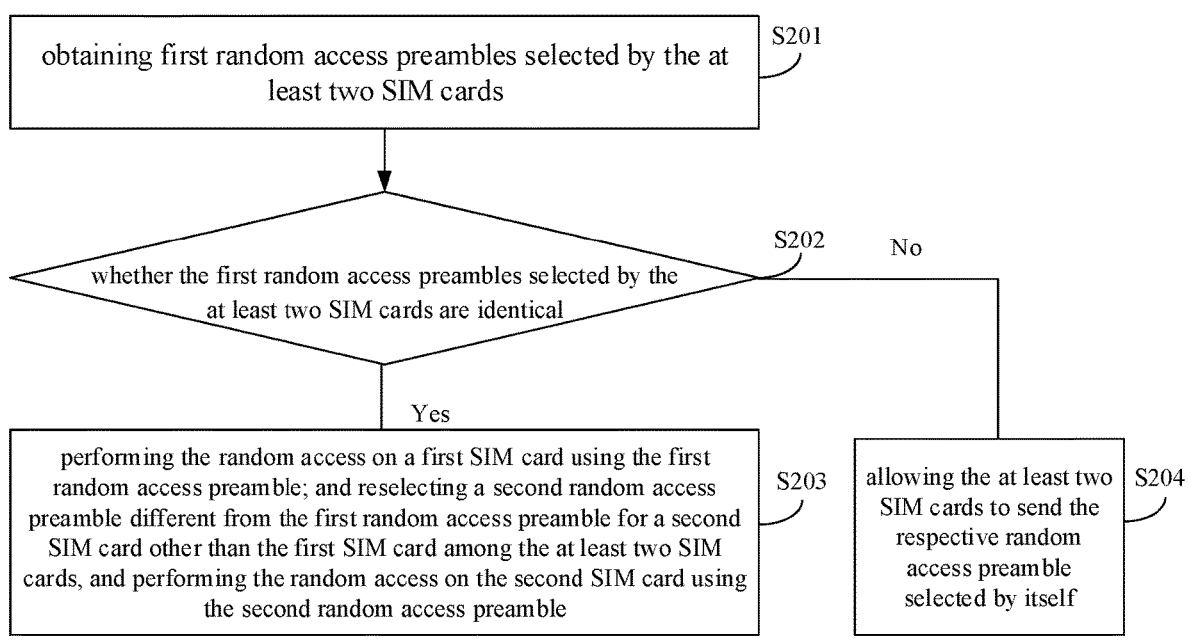
FIG. 2A is a flowchart of another random access method according to an exemplary embodiment of the disclosure.

FIG. 2A is a flowchart of another random access method according to an exemplary embodiment of the disclosure. This embodiment is described from the side of a multi-card terminal. At least two SIM cards are installed on the multi-card terminal. The at least two SIM cards belong to the same operator, and the at least two SIM cards belong to the same operator may include the case that public land mobile networks (PLMNs) selected by the at least two SIM cards are the same. As shown in FIG. 2A, the random access method includes the following steps.

In step S201, first random access preambles selected by the at least two SIM cards are obtained.

After the multi-card terminal is turned on, at least two SIM cards of the multi-card terminal will be ready to start the random access. When the random access preambles are selected for the at least two SIM cards, the multi-card terminal is informed of the selected random access preambles.

In step S202, it is determined whether the random access preambles selected by at least two SIM cards are the same, if the random access preambles are the same, step S203 is executed, otherwise, step S204 is executed.

In step S203, the random access is performed on a first SIM card using the first random access preamble, and a second random access preamble different from the first random access preamble for a second SIM card different from the first SIM card among the at least two SIM cards is reselected, and the random access is performed on the second SIM card using the second random access preamble.

In step S204, the at least two SIM cards are allowed to send the respective random access preamble selected by itself.

In this embodiment, if the random access preambles selected by the at least two SIM cards are different, the at least two SIM cards are allowed to send the respective random access preamble selected by itself.

In the above embodiment, in view of the situation that the at least two SIM cards of the multi-card terminal belong to the same operator network, the random access is performed on different SIM cards using different preambles, thereby solving the problem of random access in the multi-card terminal, so as to solve the problem of self-collision of the multi-card terminal in the random access process. Therefore, the probability of successful random access of one SIM card or multiple SIM cards belonging to the same multi-card terminal is increased, and the performance of the multi-card terminal is improved. When the random access preambles selected by the at least two SIM cards are different, the at least two SIM cards are allowed to transmit the respective random access preamble selected by itself, to better avoid the self-collision problem in the random access process.

Figure 2B:
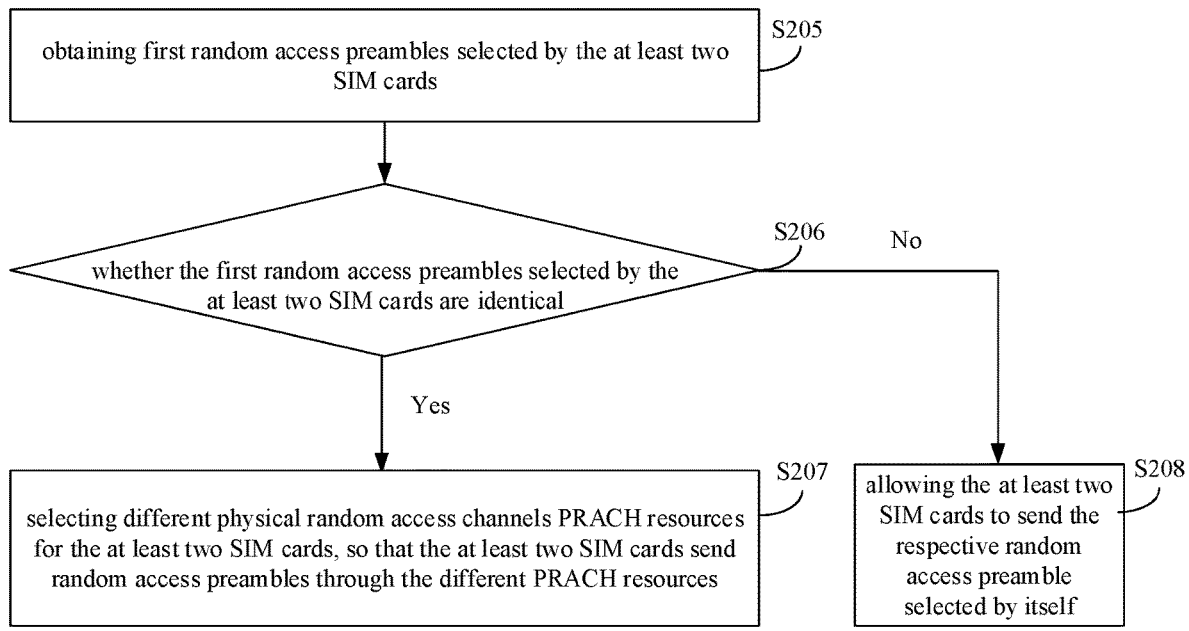
FIG. 2B is a flowchart of another random access method according to an exemplary embodiment of the disclosure.

FIG. 2B is a flowchart of another random access method according to an exemplary embodiment of the disclosure. This embodiment is described from the side of a multi-card terminal. At least two SIM cards are installed on the multi-card terminal. The at least two SIM cards belong to the same operator, and the at least two SIM cards belong to the same operator may include the case that public land mobile networks (PLMNs) selected by the at least two SIM cards are the same. As illustrated in 2B, the random access method includes the following steps.

In step S205, first random access preambles selected by the at least two SIM cards are obtained.

After the multi-card terminal is turned on, the at least two SIM cards of the multi-card terminal will be ready to start the random access. When the random access preambles are selected for the at least two SIM cards, the multi-card terminal is informed of the selected random access preambles.

In step S206, it is determined whether the random access preambles selected by at least two SIM cards are the same, if the random access preambles are the same, step S207 is executed, otherwise, step S208 is executed.

In step S207, different physical random access channels PRACH resources are selected for the at least two SIM cards, so that the at least two SIM cards send random access preambles through the different PRACH resources.

In step S208, the at least two SIM cards are allowed to send the respective random access preamble selected by itself.

In this embodiment, if the random access preambles selected by at least two SIM cards are different, the at least two SIM cards are allowed to send the respective random access preamble selected by itself.

In the above embodiment, in view of the situation where the at least two SIM cards of a multi-card terminal belong to the same operator network, the same preamble is sent on different SIM cards through different PRACH resources, so as to solve the problem of self-collision of the multi-card terminal in the random access process. Therefore, the probability of successful random access of one SIM card or multiple SIM cards belonging to the same multi-card terminal is increased, and the performance of the multi-card terminal is improved. When the random access preambles selected by the at least two SIM cards are different, the at least two SIM cards are allowed to transmit the respective random access preamble selected by itself, to better avoid the self-collision problem in the random access process.

Figure 3:
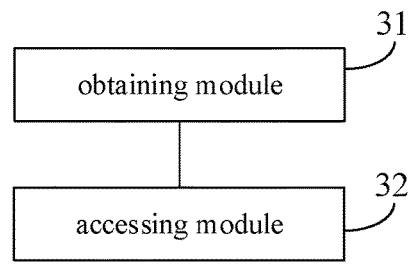
FIG. 3 is a block diagram of a random access apparatus according to an exemplary embodiment.

FIG. 3 is a block diagram of a random access apparatus according to an exemplary embodiment. The random access apparatus is located in a multi-card terminal, and at least two user identification SIM cards are installed on the multi-card terminal. As shown in FIG. 3, the random access apparatus includes: an obtaining module 31 and an accessing module 32.

The obtaining module 31 is configured to obtain first random access preambles selected by the at least two SIM cards.

After the multi-card terminal is turned on, at least two SIM cards of the multi-card terminal will be ready to start the random access. When the first random access preambles are selected for the at least two SIM cards, the multi-card terminal is informed of the selected random access preambles.

The accessing module 32 is configured to select different modes for the at least two SIM cards to carry out a random access in response to the first random access preambles selected by the at least two SIM cards being the same.

Optionally, in the embodiment, the at least two SIM cards belong to a same operator. The at least two SIM cards belong to the same operator may include the case that public land mobile networks (PLMNs) selected by the at least two SIM cards are the same.

In the above embodiments, when the random access preambles selected by at least two SIM cards of the multi-card terminal are the same, different modes are selected for the at least two SIM cards to carry out the random access, to solve the problem of self-collision of the multi-card terminal in the random access process and to increase the probability of successful random access of one SIM card or multiple SIM cards belonging to the same multi-card terminal, thereby improving the performance of the multi-card terminal.

Figure 4A:
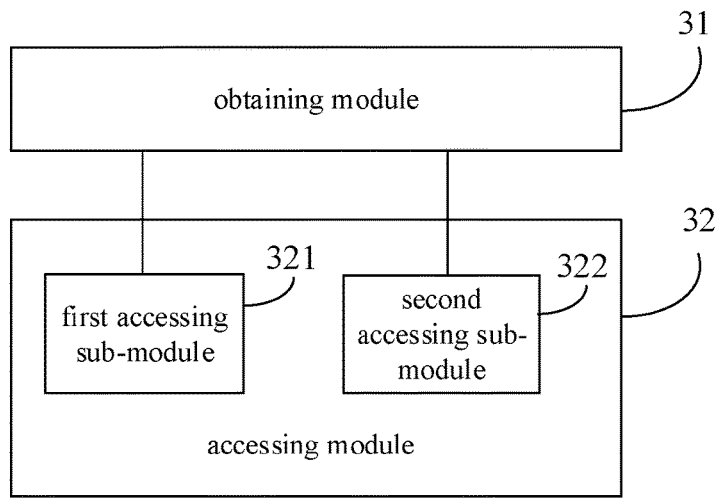
FIG. 4A is a block diagram of another random access apparatus according to an exemplary embodiment.

FIG. 4A is a block diagram of another random access apparatus according to an exemplary embodiment. As shown in FIG. 4A, based on the embodiment shown in FIG. 3, the accessing module 32 may include: a first accessing sub-module 321 and a second accessing sub-module 322.

The first accessing sub-module 321 is configured to perform the random access on a first SIM card using the first random access preamble.

The second accessing sub-module 322 is configured to reselect a second random access preamble different from the first random access preamble for a second SIM card different from the first SIM card among the at least two SIM cards, and perform the random access on the second SIM card using the second random access preamble.

In this embodiment, if the random access preambles selected by the at least two SIM cards are the same, the random access is performed on the first SIM card using the selected random access preambles, a second random access preamble different from the first random access preamble for a second SIM card different from the first SIM card among the at least two SIM cards is reselected, and the random access is performed on the second SIM card using the second random access preamble.

For example, there are two SIM cards in the existing multi-card terminal, namely SIM card 11 and SIM card 12. The random access preamble selected by SIM card 11 is X, and the random access preamble selected by SIM card 12 is also X, the random access is performed on SIM card 11 using X, and a random access preamble different from X is reselected for SIM card 12, for example, Y, so that the random access is performed on SIM card 12 using Y.

In the above embodiment, in view of the situation that at least two SIM cards of a multi-card terminal belong to the network of the same operator, different preambles are selected for different SIM cards to perform the random access, to solve the problem of self-collision of the multi-card terminal in the random access process and to increase the probability of successful random access of one SIM card or multiple SIM cards belonging to the same multi-card terminal, thereby improving the performance of the multi-card terminal.

Figure 4B:
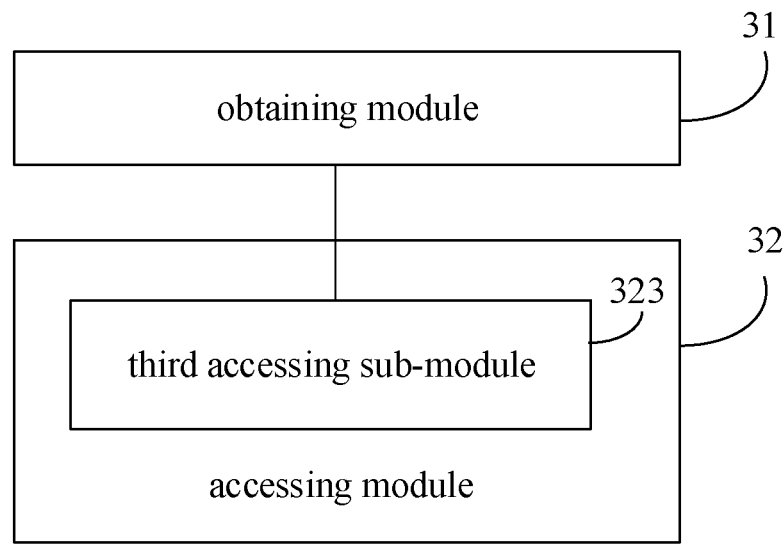
FIG. 4B is a block diagram of another random access apparatus according to an exemplary embodiment.

FIG. 4B is a block diagram of another random access apparatus according to an exemplary embodiment. As shown in FIG. 4B, based on the embodiment shown in FIG. 3, the accessing module 32 may include: a third accessing submodule 323.

The third accessing sub-module 323 is configured to select different physical random access channel PRACH resources for the at least two SIM cards, so that the at least two SIM cards send random access preambles through the different PRACH resources.

In this embodiment, if the random access preambles selected by the at least two SIM cards are the same, different physical random access channel (PRACH) resources can be selected for the at least two SIM cards, so that at least two SIM cards send the random access preambles through different PRACH resources.

For example, there are two SIM cards in the existing multi-card terminal, namely SIM card 11 and SIM card 12. The random access preamble selected by SIM card 11 is X, and the random access preamble selected by SIM card 12 is X. Different PRACH resources can be selected for SIM card 11 and the SIM card 12, so that SIM card 11 and SIM card 12 send the random access preamble X through different PRACH resources.

In the above embodiment, in view of the situation that the at least two SIM cards of the multi-card terminal belong to the same network of the operator, different SIM cards use different PRACH resources to send the same preamble, to solve the problem of self-collision of the multi-card terminal in the random access process and to increase the probability of successful random access of one SIM card or multiple SIM cards belonging to the same multi-card terminal, thereby improving the performance of the multi-card terminal.

Figure 5:
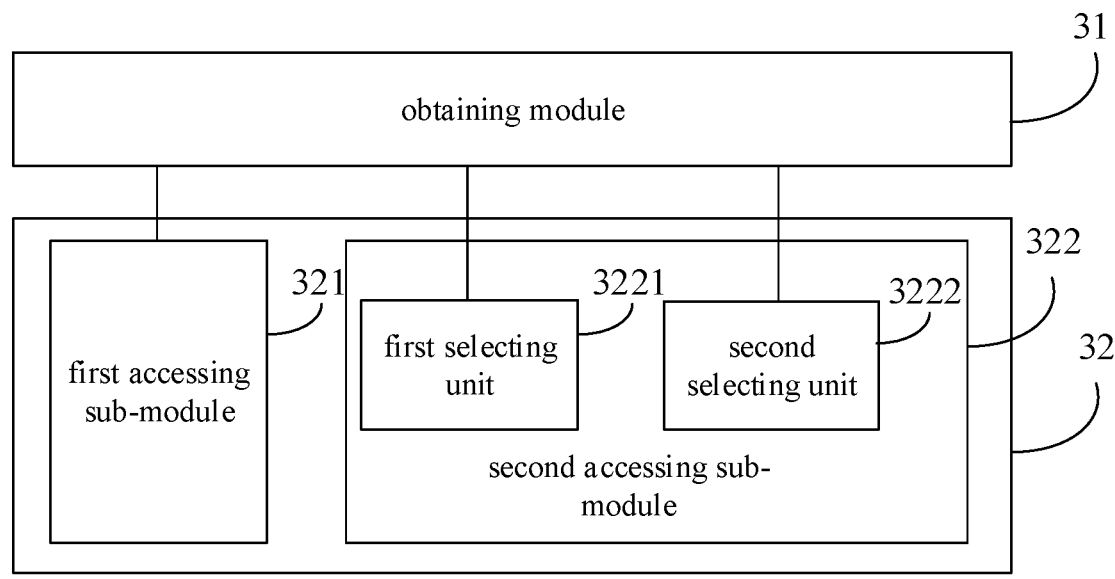
FIG. 5 is a block diagram of another random access apparatus according to an exemplary embodiment.

FIG. 5 is a block diagram of another random access apparatus according to an exemplary embodiment. As shown in FIG. 5, based on the embodiment shown in FIG. 4A, the second accessing sub-module 322 may include: a first selecting unit 3221 and a second selecting unit 3222.

The first selecting unit 3221 is configured to, in response to one second SIM card, reselect the second random access preamble different from the first random access preamble for the second SIM card.

The second selecting unit 3222 is configured to, in response to multiple second SIM cards, reselect different second random access preambles different from the first random access preamble for the multiple second SIM cards.

In the above embodiment, by selecting a different random access preamble for the second SIM card, the self-collision problem in the random access process can be better avoided.

Figure 6:
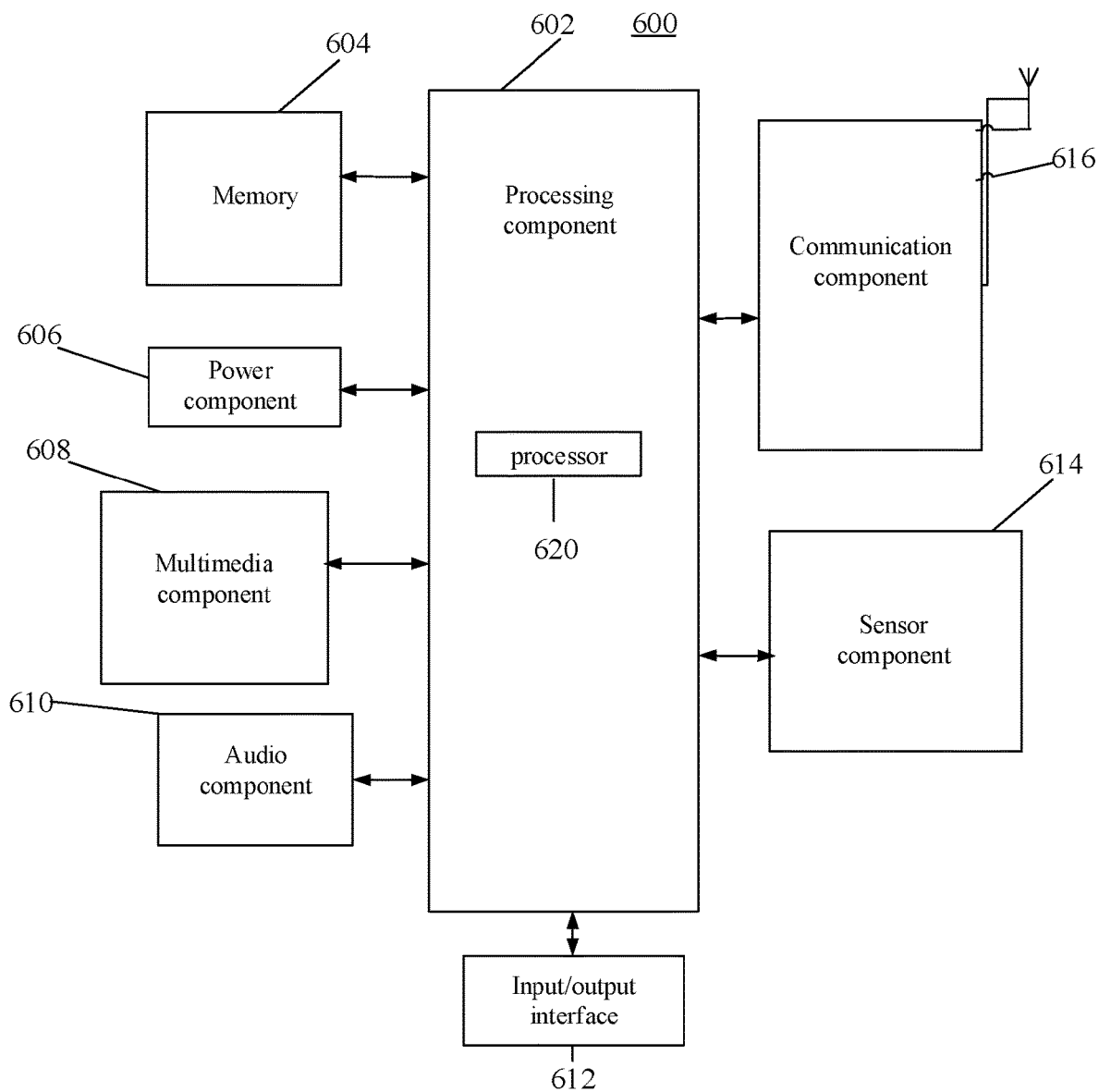
FIG. 6 is a block diagram of a random access apparatus according to an exemplary embodiment.

FIG. 6 is a block diagram of a random access apparatus 600 according to an exemplary embodiment.

For example, the random access apparatus 600 may be a mobile phone, a computer, a digital broadcasting terminal, a message transceiver device, a game console, a tablet device, a medical device, a fitness device and a personal digital assistant.

As illustrated in FIG. 6, the apparatus 600 may include one or more of: a processing component 602, a memory 604, a power component 606, a multimedia component 608, an audio component 610, an input/output (I/O) interface 612, a sensor component 614, and a communication component 616.

The processing component 602 generally controls overall operations of the apparatus 600, such as the operations associated with display, telephone calls, data communications, camera operations, and recording operations. The processing component 602 may include one or more processors 620 to execute instructions to perform all or part of the steps in the above described method. Moreover, the processing component 602 may include one or more modules which facilitate the interaction between the processing component 602 and other components. For instance, the processing component 602 may include a multimedia module to facilitate the interaction between the multimedia component 608 and the processing component 602.

One of the processors 620 in the processing component 602 may be configured to: obtain first random access preambles selected by the at least two SIM cards; and select different modes for the at least two SIM cards to carry out a random access in response to the first random access preambles selected by the at least two SIM cards being the same.

The memory 604 is configured to store various types of data to support the operation of the apparatus 600. Examples of such data include instructions for any applications or methods operated on the apparatus 600, contact data, phonebook data, messages, pictures, and video. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front-facing camera and/or a rear-facing camera. When the apparatus 600 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 600. For instance, the sensor component 614 may detect an open/closed status of the apparatus 600, relative positioning of components, e.g., the display and the keypad, of the apparatus 600, a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as WiFi, 2G, or 3G, or a combination thereof. In an exemplary embodiment, the communication component 616 receives a broadcast signal or broadcast associated information from an external broadcast management system via a broadcast channel. In an exemplary embodiment, the communication component 616 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 604, executable by the processor 620 in the apparatus 600, for performing the above method. For example, the non-transitory computer-readable storage medium may be a ROM, a RAM, a CD-ROM, a magnetic tape, a floppy disc, an optical data storage device, and the like.

Generally, the device embodiments correspond to the method embodiments, related details can be referred to part of the description of the method embodiments. The device embodiments described above are merely illustrative, where the units described as separate components may or may not be physically separated, and the components displayed as units may or may not be physical units. That is, the units may be located in one place, or distributed to multiple network units. Some or all of the modules can be selected according to actual needs to achieve the objectives of the solutions of the embodiments, which can be understood and implemented by those of ordinary skill in the art without inventive works.

It should be noted that in the disclosure, relational terms such as "first" and "second" are only used to distinguish one entity or operation from another entity or operation, which does not necessarily require or imply any such actual relationship or order between these entities or operations. The terms "include", "contain", or any other variants thereof are intended to cover non-exclusive inclusion, so that a process, method, article or device that includes a series of elements includes not only those elements, but also other elements that are not explicitly listed, or inherent elements of such process, method, article or device. If there are no more restrictions, the element defined by the sentence "comprising a . . . " does not exclude the existence of other identical elements in the process, method, article, or device that includes the element.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A random access method, wherein the method is applied to a multi-card terminal, and at least two subscriber identification module SIM cards are installed on the multi-card terminal, the method comprises:
   obtaining first random access preambles selected by the at least two SIM cards; wherein obtaining the first random access preambles selected by the at least two SIM cards comprises receiving the first random access preambles from the at least two SIM cards; and
   selecting different modes for the at least two SIM cards to carry out a random access in response to determining that the first random access preambles selected by the at least two SIM cards are the same;
   wherein selecting different modes for the at least two SIM cards to carry out the random access comprises:
   in response to multiple second SIM cards, reselecting second random access preambles different from the first random access preambles for the multiple second SIM cards and each of the second random access preambles being different to solve a problem of self-collision of the multi-card terminal in the random access.

2. The method according to claim 1, wherein the at least two SIM cards belong to a same operator.

3. The method according to claim 1, wherein public land mobile networks (PLMNs) selected by the at least two SIM cards are the same.

4. A random access apparatus, wherein the apparatus is applied to a multi-card terminal, and at least two subscriber identification module SIM cards are installed on the multi-card terminal, the apparatus comprises:
   a processor;
   a memory for storing instructions executable by the processor;
   wherein, the processor is configured to:
   obtain first random access preambles selected by the at least two SIM cards; wherein when obtains the first random access preambles selected by the at least two SIM cards, the processor is configured to receive the first random access preambles from the at least two SIM cards; and
   select different modes for the at least two SIM cards to carry out a random access in response to determining that the first random access preambles selected by the at least two SIM cards are the same;
   wherein the processor is configured to:
   in response to multiple second SIM cards, reselect second random access preambles different from the first random access preambles for the multiple second SIM cards and each of the second random access preambles being different to solve a problem of self-collision of the multi-card terminal in the random access.

5. The apparatus according to claim 4, wherein the at least two SIM cards belong to a same operator.

6. The apparatus according to claim 4, wherein public land mobile networks (PLMNs) selected by the at least two SIM cards are the same.

7. A computer-readable storage medium having computer instructions stored thereon, wherein when the instructions are executed by a processor, the processor is caused to implement a random access method, the method is applied to a multi-card terminal, and at least two subscriber identification module SIM cards are installed on the multi-card terminal, and the method comprises:

obtaining first random access preambles selected by the at least two SIM cards; wherein obtaining first random access preambles selected by the at least two SIM cards comprises receiving the first random access preambles from the at least two SIM cards; and selecting different modes for the at least two SIM cards to carry out a random access in response to the first random access preambles selected by the at least two SIM cards being the same;

wherein selecting different modes for the at least two SIM cards to carry out the random access comprises:

in response to multiple second SIM cards, reselecting second random access preambles different from the first random access preambles for the multiple second SIM cards and each of the second random access preambles being different to solve a problem of self-collision of the multi-card terminal in the random access.

* * * * *